Dec. 12, 1967     L. GIDGE ET AL     3,358,061
METHOD AND APPARATUS FOR HEAT SHAPING OF PLASTIC
Filed Sept. 7, 1965     3 Sheets-Sheet 1

INVENTORS
LESTER GIDGE
VALMOR R. POULIN JR.
BY Pearson + Pearson
ATTORNEYS

Dec. 12, 1967 L. GIDGE ET AL 3,358,061
METHOD AND APPARATUS FOR HEAT SHAPING OF PLASTIC
Filed Sept. 7, 1965 3 Sheets-Sheet 2

INVENTORS
LESTER GIDGE
VALMOR R. POULIN JR.
BY Pearson + Pearson
ATTORNEYS

Dec. 12, 1967     L. GIDGE ET AL     3,358,061
METHOD AND APPARATUS FOR HEAT SHAPING OF PLASTIC
Filed Sept. 7, 1965     3 Sheets-Sheet 3

INVENTORS
LESTER GIDGE
VALMOR R. POULIN JR.
BY
*Pearson + Pearson*
ATTORNEYS

United States Patent Office 3,358,061
Patented Dec. 12, 1967

3,358,061
METHOD AND APPARATUS FOR HEAT SHAPING OF PLASTIC
Lester Gidge, 61 Linwood St., and Valmor R. Poulin, Jr., 70 Forest Park Drive, both of Nashua, N.H. 03060
Filed Sept. 7, 1965, Ser. No. 485,177
13 Claims. (Cl. 264—89)

This invention relates to an improved apparatus and method for forming flat plastic sheet material into shaped articles. It relates especially to the forming of articles such as shallow, rimmed container tops without creating visible fish-eye, rain-drop, or bubble marks in the flat portions of such articles.

Sheet shaping apparatus of the type with which this invention is concerned, is well known, and conventionally includes means for advancing a sheet, or web, of thermoplastic material, such as bi-axial, oriented styrene or polystyrene, in a path between a hot plate platen and a female die platen. Upon the closing of the platens into sealing engagement on the plastic sheet material, low fluid pressure passing through the female die pushes the plastic sheet against the hot plates to heat and soften the material. Higher fluid pressure passing through the hot plate platen then pushes the softened plastic sheet down into the female forming die to assume the shape thereof. The platens are then separated, fluid pressure passing through the female die strips the shaped article therefrom, and the plastic sheet advances further along its path to a severing, or other, station.

Exemplary of such apparatus is U.S. Patent 2,926,385 to Willson of Mar. 1, 1960.

One of the problems in all plastic shaping processes is the entrapment of air between the hot plate surface and the plastic sheet and between the face of the metal die, or mold, and the heat softened plastic forced into the cavity of the die, or over the mold.

In order to remove, and vent, this trapped air, it is common practice to machine openings, or vents, wherever possible in the metal die, or mold, the openings being small anough to prevent the plastic from any more than just starting to enter the opening before freezing. Such openings may be as small as approximately two-thousands of an inch, but still tend to show the mark thereof in the shaped plastic article. For example, if the opening is circular and formed between a vent plug and the remainder of the die, the mark may appear as a circular rib in the article corresponding to the shape of the opening.

It is also common practice to sandblast, or vaporblast the face of the die, or mold, to form multiple small pockets therein into which entrapped air can be received and distributed in small particles over the entire area, rather than accumulating as a bubble in one or more places. Such bubbles prevent the plastic from being properly heated and shaped against the face of the die, or mold. Each sandblasted indent, or recess, traps a minute quantity of air, which in turn forms an indent, or mark, in the shaped article. These indents are not joined together by passages but each is isolated from the others.

Conventional methods for removing trapped air, whether by machined vent openings or by a multiplicity of unconnected indents, all leave marks on the finished plastic articles, and such marks are objectionable in that the commercial acceptability of the article is reduced.

Such articles are more acceptable when the relatively large area, flat, or slightly curved surfaces of the containers, or similar shaped articles, are crystal clear and free of all perceptible markings.

Aluminum molds can be hard coated to give the surface much better wearing qualities, and it is common practice to so hard coat aluminum forming molds or dies. The hard coating process not only hardens the face of the die, or mold, which is its principal function, but also changes the structure of the surface metal to a crystalline construction.

Hard coated aluminum is achieved by an anodic oxide coating on the surface of the aluminum, and such coatings are well known to those skilled in the art, and therefore not described in detail herein. Reference is made to the publication "Conference on Anodising Aluminum," published by The Aluminum Development Association, 33 Grosvernor Street, London, England, in May 1962, concerning the proceedings at the University of Nottingham, September 12 to 14, 1961, and especially to the following papers published therein:

"A Theory for the Formation of Anodic Oxide Coatings on Aluminum," pp. 83–95.

"Anodic Finishes for Wear Resistance," pp. 137, 149, and

"The Sealing of Porous Anodic Oxide Films on Aluminum," pp. 186–200.

It will be seen therefrom that aluminum having a hard anodic oxide coating is protected by a non-porous continuous barrier film near the aluminum itself, but that the outer portion of the coating includes what are called "pores" which are imperceptible to the eye and visible only when highly magnified. The pore size and the thickness of the barrier layer per volt depend upon the anodising electrolyte and the outer layer of lower density, which shows in electron microscopy as pores, may be less than .002 inch and .003 inch (50–75 microns) in thickness.

In hard anodising, the aluminum surface to be treated is made the anode in an electrolyte colder than the normal anodising bath. The flow of electricity through the anode converts the surface of the metal into aluminum oxide of greatly increased hardness and resistance to wear and abrasion. Despite its hardness, the coating structure has inherent microporosity in its hard outer face.

A method of forming hard, abrasion resistant coatings on aluminum is disclosed in U.S. Patent No. 2,692,851.

In view of the difficulty of illustrating a microscopically pitted, porous outer layer, such as described above, it has been portrayed herein schematically as a pattern of interconnected flow channels, or cracks, rather than to attempt to show its microporous, charcoal-like surface.

We have discovered that by combining this hardened, crystalline surface with a multi-part face portion of a die, or mold, for example, by providing a face portion member with a plug aperture and filling the aperture with a plug, much smaller vent openings are achieved for permitting trapped air to escape. By such a structure, the vent marks can be minimized to the degree of complete disappearance. In accordance with the invention, the two aluminum members forming the face of the die meet at a mechanically tight, close fitting joint, which, in the case of an apertured member filled with a cylindrical plug, will be formed by the cylindrical outer wall of the plug and the cylindrical inner wall of apertured member. If the members are upstanding laminated plates, the contact fit, zero clearance joint will be along the abutting edges of the plates.

The mating, mechanically tight, walls, or edges, forming the joint are hard anodized coated to a crystalline surface, which under magnification is fibrous or porous in appearance with very small microscopic pits or pores which form channels, or cracks, leading in all directions, or omnidirectionally, over the hard coated face of the aluminum. We have found that such pits or pores are sufficiently interconnected to pass air from one to another despite the joint being so close fitting and tight as not to make a visible mark in the plastic. The tight joint, with its hard coated, crystallized aluminum mating faces, thus serves as a fluid passage for the introduction of air into the recess of the female die, or mold, or for venting entrapped air therefrom.

We have also found that by combining such a hard coated tight joint with a similar hard anodized coating on the flat planar face of the die, the microscopic pits, pores or channels in the porous face connect with the microscopic pits, pores or channels in the joint to vent air from under the heat softened plastic, flatwise engaging the face without marking the plastic. Unlike the dull finish caused by sandblasting, which is transferred to the finished plastic article, even when a fine abrasive is used, We have found that the hardened crystallized surface of the die can remain polished because the microscopic air channels provide the necessary venting, thereby eliminating the necessity for sandblasting. However, when sandblasting is desired, the hard coated crystalline surface of the flat planar face of the die helps to distribute the trapped air more evenly over the die face.

In addition to eliminating dead end indents, or recesses, in the flat planar faces of the die, such as occur with sandblasting, this invention contemplates the intentional provision of dead end recesses in the hot plate of the apparatus. It has been found that an upstanding annular projection in the female die, designed to form an annular groove, or rib, in the article, or to form the rim of the article, tends to cause an undesirable attention in the rib, or rim, portion of the article, which produces weakness where strength is desired. We have found that the provision of a dead end annular groove in the hot plate, opposite to the annular rib, or annular peripheral projection, in the female die, will entrap air when the plastic sheet is pushed against the hot plate. The entrapped air tends to retard the heating of the plastic at the rib location, so that it retains more of the original plastic thickness and therefore forms a relatively thick and strong rib, or rim, in the finished article.

We have further found that the flat planar condition of the plastic web can be better retained during the die pressing step, by providing a floating cooling plate, or a floating gasket of non heat conductive material, as a seal between the periphery of the hot plate platen and the plastic sheet.

In addition, the invention combines the flat planar hard coated face of the female die with a hot plate face, which is curved out of parallelism with the plane of the die face, so that one portion of the hot plate face will contact the plastic in advance of the remaining portion. Thus the first portion to engage the plastic tends to sweep any air radially toward the remaining portion of the hot plate face, from which portion the air may be vented. Thus air is not entrapped but is swept, or wiped, by the plastic toward the vent apertures in the hot plate.

It is the object of the invention to provide an apparatus and method for producing shaped plastic articles which are more commercially acceptable by reason of the absence of visible vent or other marks in the flat portions thereof.

Another object of the invention is to provide means for eliminating the entrapment of air in heat softened plastic being shaped into shallow container tops while intentionally entrapping air in dead end recesses in the hot plate for thickening and strengthening the rib, or rim, parts of such tops.

Another object of the invention is to provide a method and apparatus for use in the face of a blow mold die, a sheet shaping die, or the like, which includes an air passage formed by a contact fit, zero clearance joint in two hard coated aluminum members, the members being in contact with each other, but the crystalline surface with its pits, or channels, passing air for venting or pressure purposes.

A further object of the invention is to provide a floating cooling plate or gasket for sealing air into a plastic shaping press while retaining the original flat configuration of the plastic sheet from which the articles are formed.

Other objects and advantages of the invention will be apparent from the claims, the description of the drawings, and from the drawings, in which:

Figure 1:
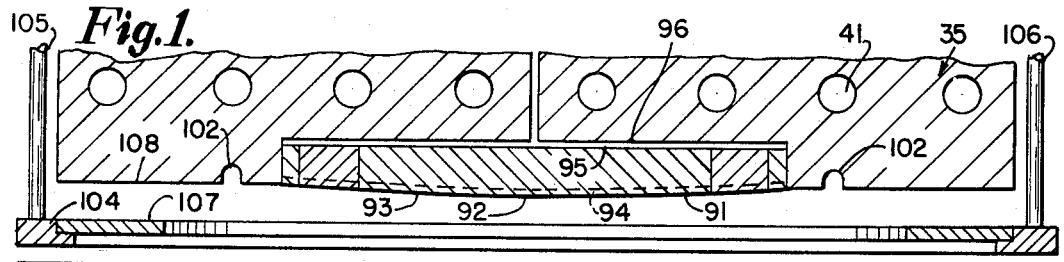
FIGURE 1 is a half sectional elevation of the portion of a plastic shaping press with which the invention is concerned, showing the hot plate platen, the plastic sheet material and showing the female die platen in lowered position.
Figure 2:
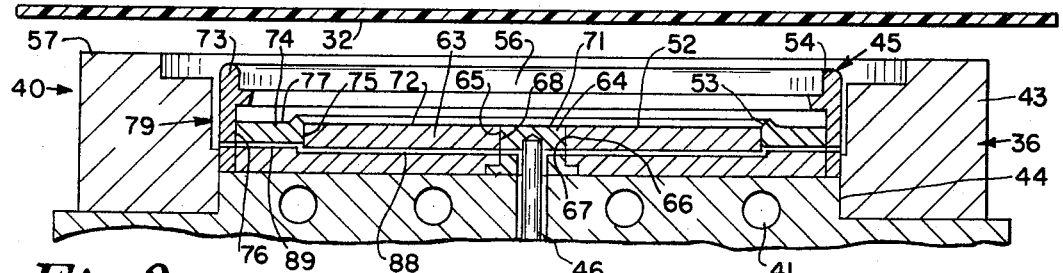
FIGURE 2 is a view similar to FIGURE 1, showing the female die platen in upper position, sealed against the hot plate platen.
Figure 3:
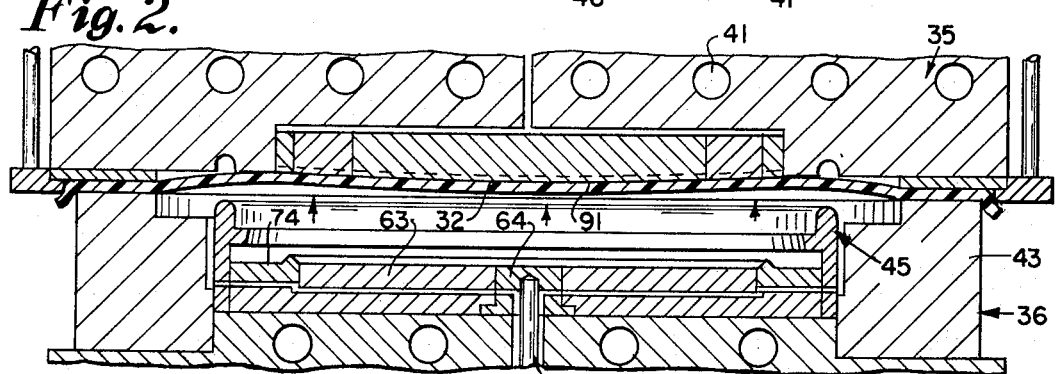
FIGURE 3 is a view similar to FIGURE 2, showing the softened plastic sheet assuming the shape of the female die.
Figure 4:
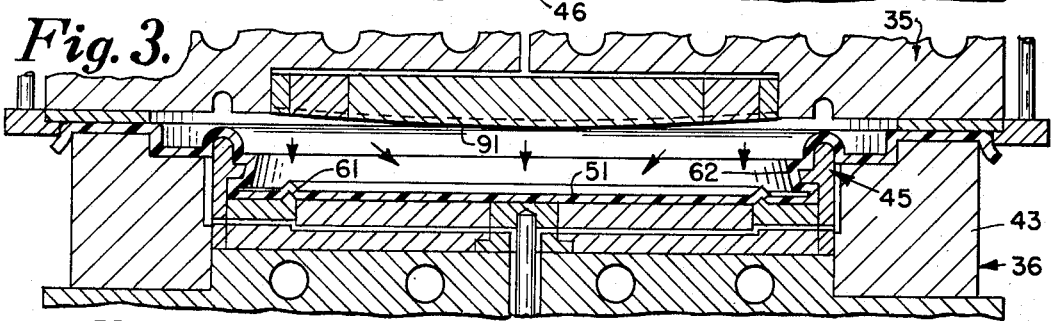
FIGURE 4 is a view similar to FIGURE 1, showing the stripping action as the female die platen is moved downwardly to the lowered position of FIGURE 1.
Figure 5:
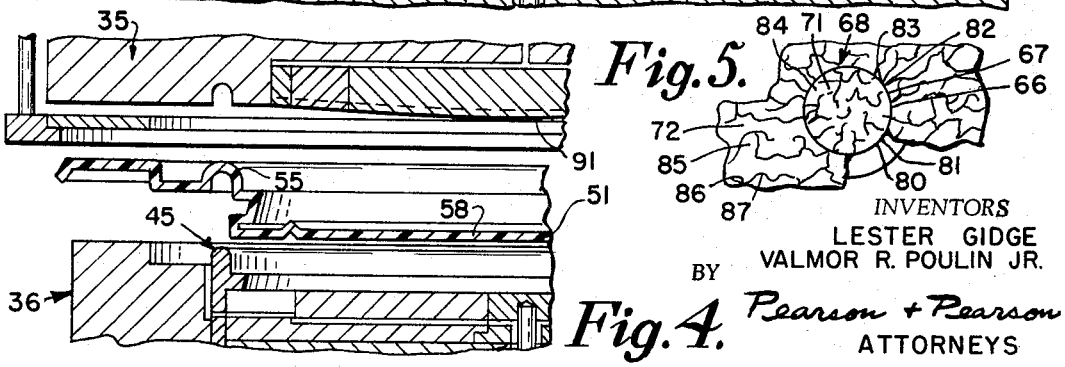
FIGURE 5 is a fragmentary, greatly enlarged, perspective view showing the hard coated, crystalline aluminum surface on the face of the die and on the walls of the joint formed by a tight fitting plug.
Figure 6:
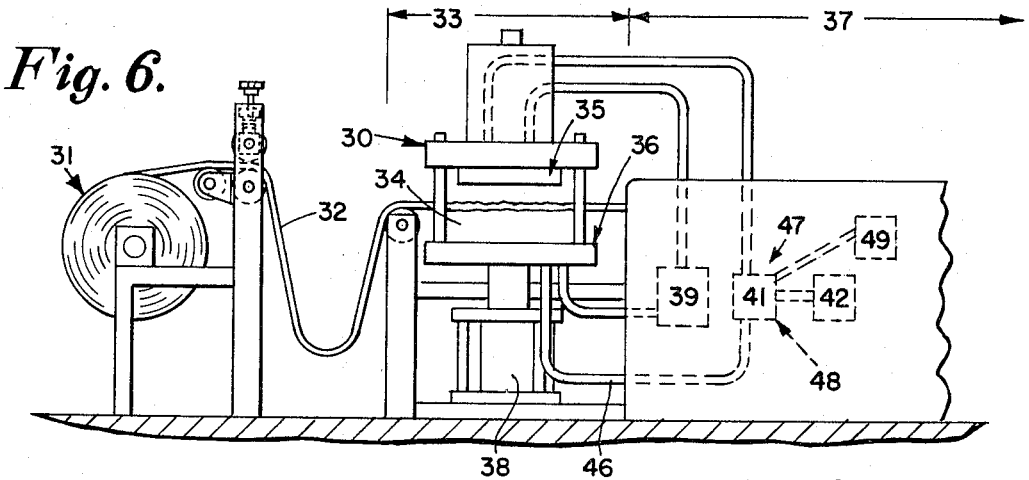
FIGURE 6 is a schematic front elevation of a typical plastic shaping press, on a reduced scale.

As shown in FIGURE 6, one form of plastic shaping press 30, now in use in the trade, includes suitable roll supply mechanism 31 for supplying a web 32, of the thermoplastic sheet material to be shaped, to the pressing zone 33 of the press. The web 32 is drawn in flat planar condition horizontally through the space 34 between the fixed, upper heating platen 35 and the movable lower female die platen, or mold, 36, with suitable intermittent drive means for halting the web during the shaping cycle. After the shaping cycle, the web 32, with the articles shaped therein, is further advanced into other treatment zones 37 of the press. Suitable hydraulic piston and cylinder means 38, positive air pressure supply means 39, platen heating means 41, and negative air pressure supply means 42, are provided. All of the above are well known, and therefore are not described in detail. While only a single female die is shown in the other views hereof, for convenience, it will be understood that die platen 36 conventionally contains a plurality of recessed dies in the form of a gang mold, and the heating platen 35 is correspondingly constructed in multiple, gang, fashion. The heating of the hot plates on platen 35, and/or, the heating of the female dies on platen 36, may be electrical, or otherwise, and the supplying of fluid pressure to the platens, and to the cylinder 38 by flexible conduits, pipes, etc., are in accordance with well known means, and illustrated only diagrammatically.

*Air vent means in female die platen*

In this invention, as shown on an enlarged scale in FIGURES 1–5 and FIGURE 8, the improved shaping apparatus 40 of the invention includes the movable female die platen 36, having the main support plate 43, in which there are one, or more, die openings 44, each for a female die 45, for forming and shaping the desired article. Each female die 45 is connected by at least one conduit 46 to suitable valving 47, automatically actuated by the control system 48 of the press, to supply low fluid pressure, high fluid pressure, or negative fluid pressure, or to vent the conduit to the atmosphere, as at 49. The particular die 45 illustrated is designed to form a shallow container top 51, of the type used as closures on ice cream, coffee, or similar containers. Die 45 therefore includes the flat planar face portion 52, in which there may be an annular upstanding rib 53, and the die includes the rim-forming, upstanding, peripheral rib 54, over which the heat softened plastic is shaped to form the rim 55 of the article 51. The die recess is designated 56, and the die platen sealing face is designated 57.

Conventionally, each female die 45 includes machined openings, or vents, in die face 52, which consist of suitably spaced, minute, apertures, or may consist of linear slots, of one or more circular slots, formed between the side wall of a plug, and the side wall of the aperture in which the plug is fitted, the apertures or slots tending to form a protuberance in the plastic which is visible. Such plugs are usually machined to be about .002 to .005 inch less diameter than the diameter of the aperture. It is the flat planar portion, such as 52, of the die 45 which makes such mold marks particularly perceptible, and objectionable, on the corresponding flat planar face portion, such as 58, of the finished plastic article 51. In the curved rim portion 55 of the article, along an edge 61 of an annular rib, such as 53, or along a vertically disposed face 62 of the article 51, these marks are somewhat hidden and less visible. Similarly it is the flat face portion 58, of the article 51, upon which air entrapped between the plastic 32 and the flat die face 52 may create bubbles, fish-eye marks, raindrop marks, or the like.

In this invention, the flat planar face portion 52 of each female die 45, is formed by at least two individual members, such as 63 and 64, of imperforate metal capable of being hard coated as described herein. Preferably the members 63 and 64 are of aluminum, and preferably one member, such as 63, is provided with at least one machined aperture 65, having an inside wall 66 of predetermined dimensions, and the other member 64 is provided with an outside wall 67, of identical predetermined dimensions. Each member 64 is closely fitted as a plug in the aperture of the member 63, so that the juxtaposed, unconnected, abutting side walls, 66 and 67, form a mechanically tight joint 68, with no appreciable opening between the side walls. Each member, 63 and 64, thus has a flat planar face portion, 71 or 72, which mutually form the flat planar face portion 52, while each joint 68 is located in the face 52 to form an air passage into and out of the die 45.

It will be understood that the face 52 can be formed by multiple, individual strips of aluminum, to form a series of parallel, linear, tight joints, such as 68, that the aluminum members could be a plurality of concentric rings, or the aluminum members can be a single member with a plurality of small, cylindrical vent plugs, such as member 64, fitted in apertures according to any desired pattern to form numerous cylindrical vent joints 68 over the face 52.

For illustration purposes, the female die 45 is shown as formed by a rim ring 73, encircling an outer ring 74, the ring 74 encircling the inner ring member 63 and the inner ring member 63 having the aperture 65 for the central cylindrical plug member 64. In addition to the joint 68 formed by plug 64 and ring 63, especially for venting purposes, the joint 75 between ring 74 and member 63, the joint 76 between ring 74 and rim ring 73, may also be mechanically tight and close fitting, as described herein, if it is desired to avoid the marks formed by openings of conventional width in the entire flat die face portion 52. The face 52, is thus formed by the faces 71 and 72 of members 63 and 65, and the face 77 of the outer ring 74.

The mechanically tight, close fitting joint 68, between each vent plug 64 and the member 63, will not normally pass air, but in this invention each joint 68 forms part of air vent means 79. At least one side wall, 66 or 67, of the joint, and preferably both abutting sidewalls of the aluminum members 63 and 64 are hard anodic oxide coated to form a relatively rough, hardened crystalline surface in the metal itself for such depth as is desired. The "hard coated" surfaces are designated 80 and 81, and consist of a multiplicity of microscopic pits, pores, channels, or cracks, 82, and microscopic protuberances, mounds or ribs 83 (FIGURE 5), which are not visible to the naked eye. The channels, or cracks, 82, lead omnidirectionally over the surfaces of the side walls forming the tight joint, and connect with each other sufficiently to serve as continuous air passages from the flat planar die face 52, through the joint 68 to the conduit 46 and thence to the valving 47 and atmosphere 49, or to the pressure means 39 or 42.

Forming part of air vent means 79 are the flat planar faces 71 and 72, and if desired the face 77, which are similarly hard coated at 84 and 85 to create similar microscopic pits, pores, channels, or cracks, 86, and protuberances, mounds or ribs 87, leading in all directions thereover, and connecting with the tight joint 68 to form continuous air passages over the flat die face to the joint 68. The hard coatings 84 and 85 on faces 71 and 72 do not mar the original polished finish of the face 52, so that the polish is transferred to the plastic of the article 51. It will be seen that the face 52 thus has no machined openings capable of marking the heat softened plastic 32, but air is not entrapped between the plastic and the face 52 by reason of the air escape route along the hard coated surfaces 84 and 85, and 80 and 81. The hard coated microscopic channelled air passage may be used to introduce air into the die, or extract air therefrom, if desired. Each conduit 46 is connected by suitable bores 88 and 89 to the joints 75 and 76 and to the outside of rim ring 73, or separate bores, or passages, may be provided in die 45 to connect with valving 47, all in a manner well understood in the art.

*Air escape means in hot plate platen*

The entrapment of air between the plastic 32 and each hot plate, or hot face, such as 91 in the hot plate platen 35, is as much, or more, of a problem as such entrapment between the face 52 and the plastic. When the plastic web 32 is advanced to a position between the open platens 35 and 36, and the platen 36 is closed into sealing engagement with the platen 35 under pressure of about three hundred pounds per square inch, low fluid pressure is forced through the holes in the die, such as the joints 68, 75 and 76, to push the plastic 32 up against the hot faces 91 for a fraction of a second. The faces 91, heated by the heating means 41, soften the plastic in the desired areas so that it may be shaped in the die 45. If the faces 91 are flat, planar and in parallelism with the flat face 52 of the die 45, it has been found that air becomes entrapped to form the fish-eye, raindrop, or other visible marks mentioned above, visible to the eye and objectionable in the trade.

Figure 7:
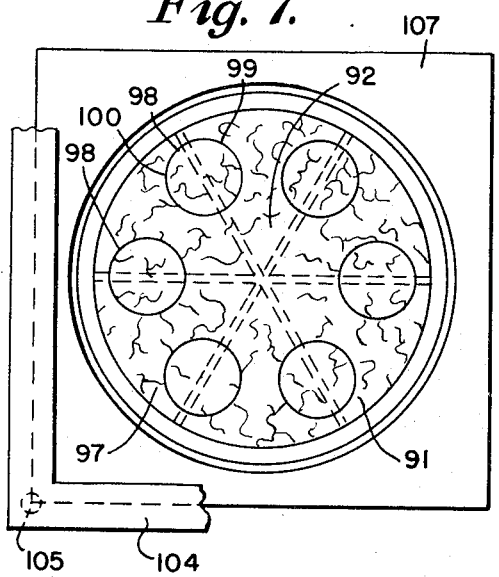
FIGURE 7 is a plan view, on a reduced scale, of the heating platen of the invention.
Figure 8:
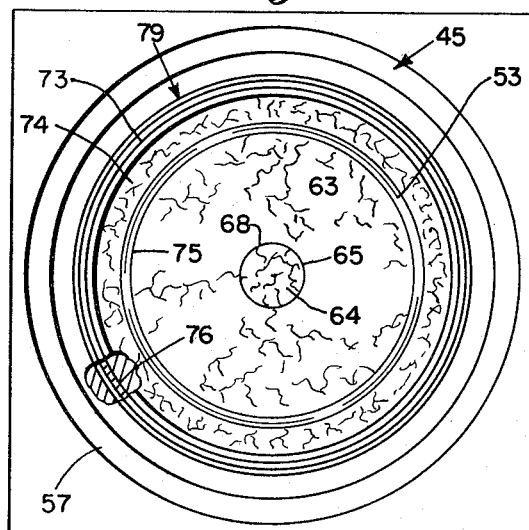
FIGURE 8 is a plan view, on a reduced scale, of the female die platen of the invention.
Figure 9:
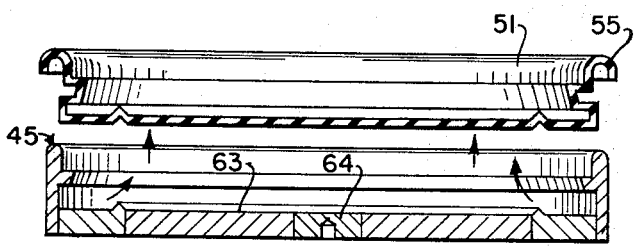
FIGURE 9 is a view, similar to FIGURE 1, of an article shaped by the apparatus and method of the invention being stripped from the die.

In this invention, the faces 91 of each hot plate are convex, or concave, and in any case in a curvilinear plane slightly out of parallelism with the flat plane of face 52. Preferably each face 91 is convexed as shown, in order that the central portion 92 will first engage the uplifted plastic 32, and in order that any air caught therebetween will be wiped, swept, or urged radially outwardly from the portion 92 to the peripheral portion 93 of the face 91. Radially extending grooves, such as 94, may be provided to collect and guide air to the peripheral collection aperture 95, connecting with bore 96, air conduit 39, and valving 47, to dissipate any bubles, or entrapped air from the face 91. Alternatively, the face 91 may be of porous material, or the portion 93 may include a multiplicity of vent plugs, such as 68, described above, for permitting air to escape. As shown in FIGURE 7, a hard coated surface 97 on the hot plate 91 and a plurality of circumferentially spaced vent plugs 98, similar to plug 63, and having hard coated side wall faces 99 and 100, similar to joint 68, are preferred in the concave face 91.

*Dead end recess means in hot plate platen*

The above specified improvements have been concerned with the release, or venting of entrapped air from between the plastic web and the platens in such a way as to avoid marks caused by port openings and to avoid fish-eye, raindrop and bubble marks. However, we have found that the deliberate entrapment of air in certain locations can be advantageous, especially in the curved plane portions of the finished article where such marks are not readily visible. For example, the curved rim 55 of each article 51, when conventionally pressure shaped from a flat web 32 tends to become unduly attenuated, or drawn to an undesirable thinness so that it is weak where the article should be strong. We therefore provide a dead end, annular groove 102 in the face 91 of the hot plate platen 35, exactly opposite to the rim ring 73 of the female die platen. The groove 102 is positioned between any air holes, bores, joints or the like, and is completely isolated from, and free of, any venting conduits so that the plastic sheet 32, when forced against the face 91, entraps air in the groove. The entrapped air insulates the plastic from the heat of the plate, so that the rim-forming area of the plastic is less softened and therefore retains its original thickness. By varying the width and depth of the groove 102, the amount of draw on the plastic can be controlled as desired to control the thickness of the plastic over the curved rim of the article. Any marks formed in the rim portion are usually not visible to the eye.

*Floating heat insulation means*

The shaping of a plurality of shallow container tops 51, from a flat sheet of plastic, usually results in the edge portions of the plastic web being permanently deformed and may result in the plastic edges being pulled into the die. We therefore provide a frame 104, of rectangular configuration, vertically movable on corner posts such as 105 and 106, and supporting a peripherally extending closed, strip, or loop, 107, of material capable of protecting the corresponding edges of the plastic from the heat of the hot platen, which may be at 350° F. The strip 107 may be of paperboard, or similar material low in heat conduction. However, as shown, we prefer to form strip 107 of hollow metal, and to continually pass liquid, such as water, therethrough, at a temperature of about 150° F., incapable of melting the plastic, by means of flexible tubes and a suitable source of cooling liquid. The raising of the die platen 36 and the raising of the web 32 causes the frame 104 to rise on its posts until the strip 107 is pinched between the sealing face 57 of the die platen and the corresponding sealing face 108 of the hot plate platen 35. The gasket or cooling plate 107 insulates the plastic from the hot plates and prevents the outer edges of the plastic 32 from becoming overheated and becoming deformed. By retaining the flat, undeformed edges of the web 32, the web can be better handled in subsequent treatment operations. Upon release of pressure, after the plastic has been shaped, the floating gasket 107 drops to its original position poised between the plastic and the platen 35.

Figure 10:
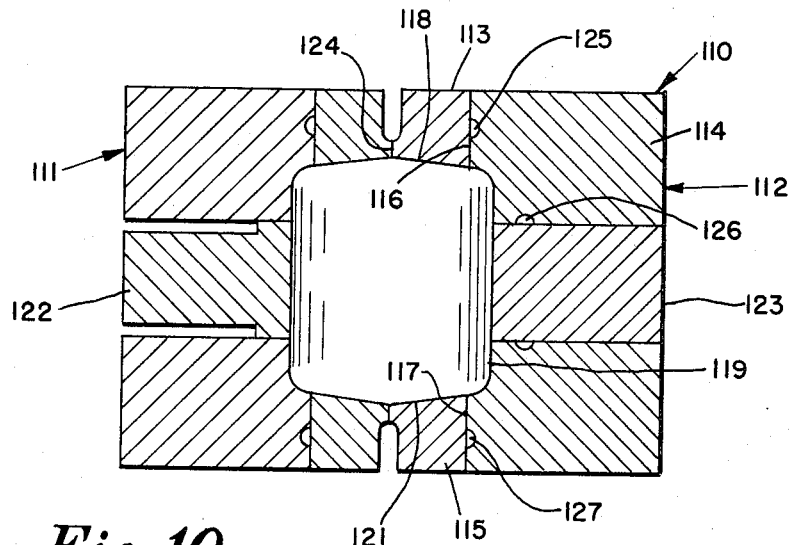
FIGURE 10 is a half sectional view, on a reduced scale, showing the aluminum, hard surface, contact fit joint applied to a typical blow mold.
Figure 11:
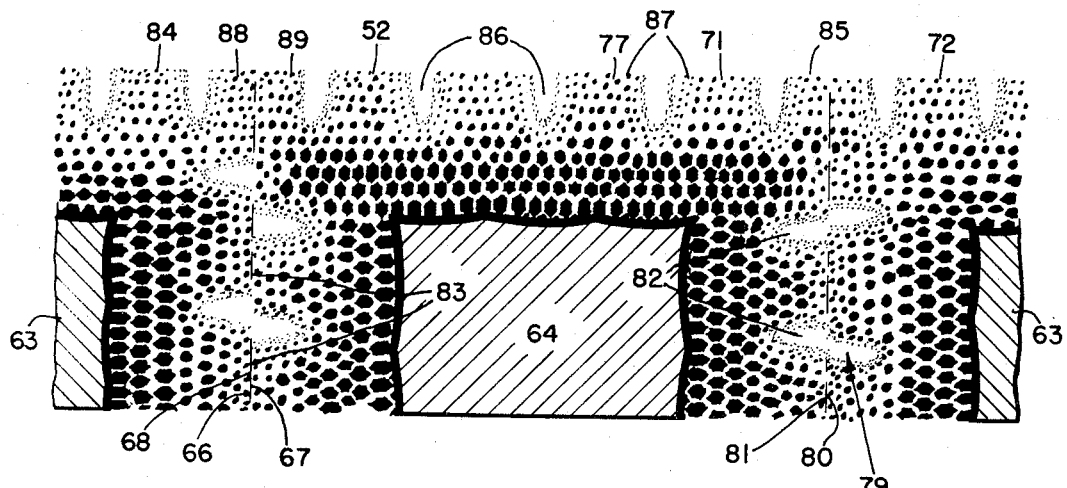
FIGURE 11 is a schematic sectional view showing the pores in the outer layer of the hard anodic oxide coating on the aluminum die face and on the plug.

As shown in FIGURE 10, a typical blow mold 110, with its two separable half sections 111 and 112, may have each section, such as 112, formed of multiple members 113, 114 and 115, of aluminum, hard coated to form contact fit, zero clearance joints 116 and 117, and hard coated mold faces 118, 119 and 121 to vent air trapped during inflation of the plastic tube. A hard coated joint may also be achieved where desired by means of plugs such as 122 and 123. The joints 116 and 117, and the plug joint 124 are connected to air passages, 125, 126, and 127, of conventional type.

The hard anodic oxide coating on the aluminum members of the invention, in addition to providing air passage means by reason of the microporous outer layer, also achieves a high release factor. Thus hot gummy plastic will not adhere to the microporous coating as it will to the uncoated metal. This is believed to be due partly to the fact that materials do not stick readily to metallic oxides and particularly to the fact that the material is resting on the mounds, or protuberances, between the pores of the coating and, upon stripping, the air is able to pass underneath the material along the channels formed by the pores to break any vacuum.

We claim:
1. In apparatus for shaping articles from flat plastic sheet material, said apparatus having a hot plate platen and a female die platen relatively movable into and out of pressing engagement, each female die having a flat planar face portion; means for moving said platens to closed position under pressure; fluid pressure means acting on said sheet material to firmly press the same against a hot face on said hot plate platen, and fluid pressure means, acting on the so heated sheet material, to move the same into shaping contact with the face of said female die, the combination of
  air vent means in said flat planar face of said female die platen, adapted to permit the escape of air entrapped under said plastic material, without creating fish-eye marks, raindrop marks, bubbles, or dull finish in said material, said vent means comprising
  at least two individual members of imperforate metal mounted in said female die, said members having flat planar faces forming said flat planar face portion, and each having a side wall, juxtaposed to, and closely fitting, a side wall of the other to mutually define an unconnected joint extending from said die face portion in a direction away from said sheet material, and
  a hard crystalline porous surface containing a multiplicity of microscopic air channels, or pores, extending omnidirectionally thereover, on at least one of the said side walls of said joint,
  the microscopic air channels in the said wall surface of said joint forming an air escape passageway in said face while said joint creates no visible marks in the said plastic material.
2. Apparatus as specified in claim 1, wherein
  both of said members are of aluminum, and said porous surface is the outer layer of an anodic oxide coating on said aluminum.
3. Apparatus as specified in claim 1, wherein
  one said member is substantially coextensive in area with said flat planar face portion of said female die, and includes an inner wall defining a plug aperture, and
  the other said member is a plug, closely fitted in said plug aperture, and having an outer wall forming said joint with the said inner wall of said first named member.

4. Apparatus as specified in claim 1, wherein
the said members are of aluminum, one said member is an annular plate with a cylindrical plug aperture, and the other said member is a cylindrical plug filling said aperture.

5. Apparatus as specified in claim 1, wherein
the said members are of aluminum and the flat planar faces thereof form the entire flat planar face portion of said female die, and
a hard crystalline, porous surface, containing a multiplicity of microscopic air channels or cracks, extending omnidirectionally thereover, on said flat planar faces of said members,
the air channels in said faces connecting with the air channels in said joint to dissipate entrapped air from under said sheet out through said joint.

6. Apparatus as specified in claim 1, wherein
said air vent means forms an influent port for introducing low pressure air into said female die to press said sheet against said hot face on said hot plate platen,
the said hot face of said hot plate platen is in a plane slightly curved out of parallelism with the flat planar face portion of said female die,
whereby one portion of said curved hot face first engages said sheet material to urge air located therebetween radially toward the remaining portion thereof, and thereby avoid entrapment of said air at said first portion.

7. Apparatus as specified in claim 1, plus
an upstanding rib extending around the peripheral portion of the flat planar face portion of said female die platen to form a rim in said sheet material, and
a peripheral groove in said hot plate platen, opposite to said rib, said groove being free of air vents and arranged to entrap air when said platens are closed and said sheet is engaged against said hot plate platen,
whereby the insulation action of said entrapped air tends to thicken and strengthen the rim portion of said articles.

8. Apparatus as specified in claim 1, plus
floating heat insulation means mounted between said hot plate platen and said sheet material, for vertical upward movement toward said platen by the upward movement of said material,
said means including a frame supporting a heat insulative strip for preventing the edges of said plastic sheet material from contacting said hot plate platen while forming an air seal around the periphery of said platen.

9. A method of venting articles of sheet plastic material being shaped in heat softened condition between forming means and a die having a substantially flat planar face portion, said method comprising the steps of
forming the said planar face portion of said die in at least two parts of aluminum, and juxtaposing said parts to form a mechanically tight, close fitting zero clearance joint therebetween,
forming a hard anodic oxide coating on the said planar aluminum faces of said members to form microscopic air channels thereon too imperceptible to form visible marks in the finish of said article,
forming a hard anodic oxide coating on the mating aluminum surfaces of the abutting side walls of said members forming said joint in the face of said die, to form said microscopic air channels therealong, and
shaping the plastic sheet by differential fluid pressure while channelling any air entrapped between said sheet material and the said planar face portion of said die along the channels in said faces and thence along the channels in said joint to thereby dissipate said air.

10. In apparatus for shaping articles from plastic material, said apparatus including a forming recess with a forming face and fluid pressure means acting on said plastic material to press the same against said face, the combination of
gas passage means in said face, said means comprising at least two individual members of imperforate metal, said members each having a face forming part of the face of said recess and each having a side wall contact fitting the other with zero clearance to define a joint extending from the face of said recess away from said plastic material, and
a hard crystalline surface containing a multiplicity of microscopic protuberances separated by microscopic recesses in the form of pock marks and cracks, imperceptible to the eye, but extending over at least one of the side walls of said joint,
said microscopic recesses in said side wall of said joint, jointly forming an air passage in the face of said recesses while said joint creates no visible mark in said plastic material.

11. In apparatus for shaping articles from plastic sheet material, said apparatus having a hot platen and a recessed platen relatively movable into and out of engagement, and normal fluid pressure means for moving said plastic material in and out of engagement with said platens, the combination of
a heated face on said hot platen opposite each forming recess in said recessed platen, said heated face being curved convexly out of parallelism with the plane of said plastic sheet material to cause one portion of said heated face to be in one plane and the remaining portion thereof to be in another plane,
whereby fluid pressure applied to said plastic sheet material from within said recess, presses said sheet first against said one portion to urge air trapped thereunder toward the said remaining portion thereof, thereby avoiding entrapment of said air.

12. In apparatus for shaping articles from plastic sheet material, said apparatus having a hot platen and a recessed platen relatively movable into and out of engagement, and having fluid pressure means for moving said plastic material in and out of engagement with said platens, the combination of
an upstanding rib extending around the peripheral portion of each recess in said recessed platen, said rib being adapted to form a corresponding rib in the article to be formed in said recess, and
a peripheral groove extending around the peripheral portion of the heated face in said hot platen, opposite to and spaced from said rib when said platens are moved, into engagement, said groove being dead-end and free of air vents or passages to entrap air, when said plastic sheet is engaged against said hot platen by said fluid pressure means, the air in said dead-end groove insulating said plastic from the heat of said platen to strengthen said plastic in the area of said rib.

13. In apparatus for shaping articles from plastic sheet material, said apparatus having a hot platen and a recessed platen relatively movable into and out of engagement and having fluid pressure means for moving said plastic material in and out of engagement with said platens, the combination of
floating heat insulation means mounted between said hot platen and said plastic material and extending peripherally around said platens to form an edge seal when said platens are closed on said plastic material,
said means including a hollow, flat strip and means for continuously feeding cooling fluid through said strip to insulate the edges of said plastic material from the heat of said hot platen.

(References on following page)

References Cited

UNITED STATES PATENTS

| | | |
|---|---|---|
| 1,671,577 | 5/1928 | Gluckin et al. |
| 1,884,708 | 10/1932 | Jeneson. |
| 2,004,652 | 6/1935 | Dempsey. |
| 2,254,376 | 4/1941 | Lyon. |
| 2,694,227 | 11/1954 | Fordyce et al. _____ 18—19 X |
| 2,952,875 | 9/1960 | Herrick _____ 18—19 |
| 2,985,914 | 5/1961 | Miller. |
| 3,011,212 | 12/1961 | Marshall et al. |
| 3,058,154 | 10/1962 | Howard et al. _____ 18—35 X |
| 3,084,388 | 4/1963 | Ballhausen _____ 18—16.5 |
| 3,118,960 | 1/1964 | Cook _____ 18—19 X |
| 3,126,582 | 3/1964 | Scott _____ 18—19 |
| 3,213,491 | 10/1965 | Craig _____ 18—16.5 |
| 3,260,781 | 7/1966 | Lux et al. _____ 18—19 X |
| 3,267,521 | 8/1966 | Kostur _____ 18—19 |

J. SPENCER OVERHOLSER, *Primary Examiner.*

J. HOWARD FLINT, Jr., *Examiner.*